May 5, 1959 A. W. WISEMAN 2,885,600
ELECTRIC CABINET
Filed Nov. 1, 1957
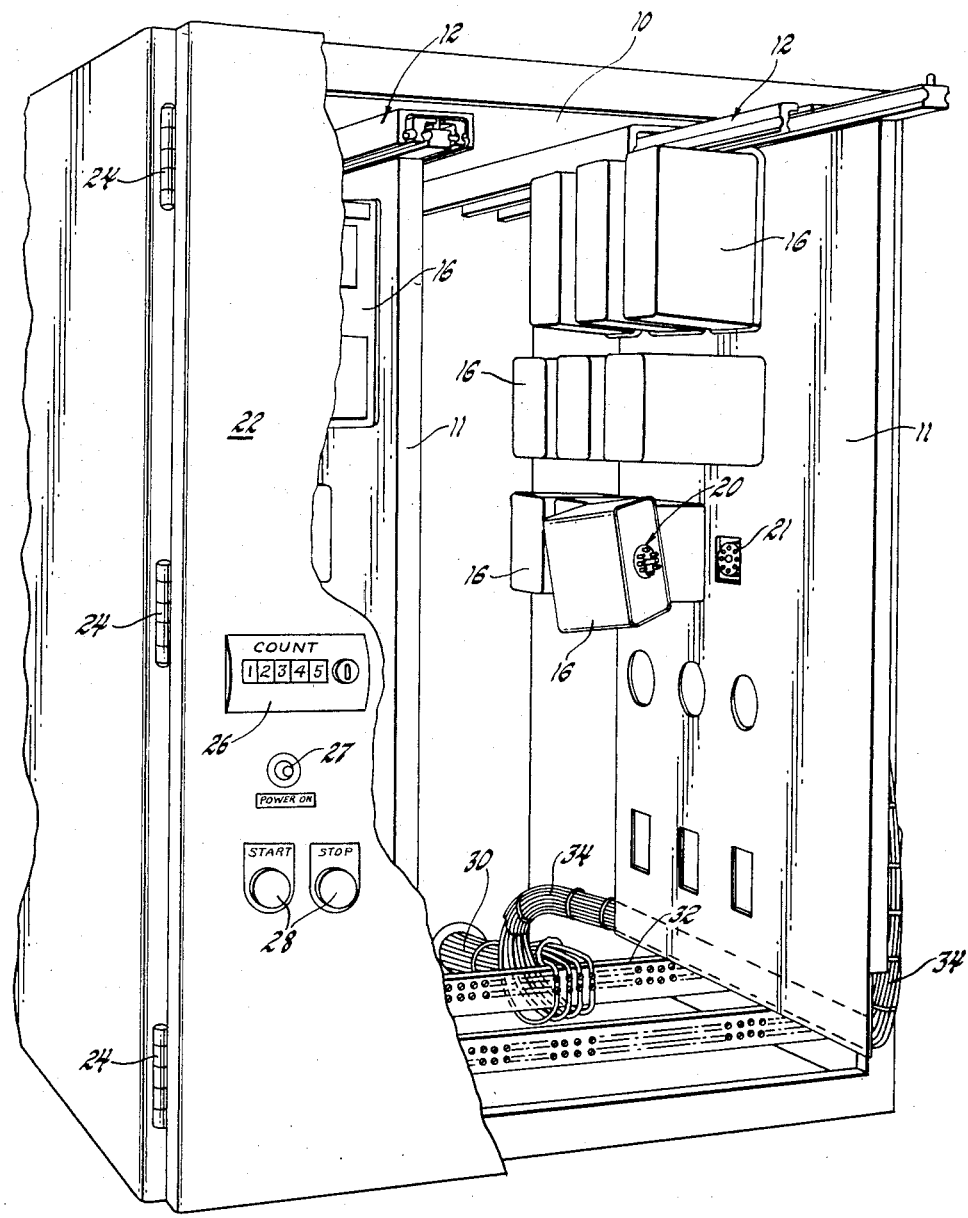
INVENTOR
Arthur W. Wiseman
BY Ernest J. Hix
ATTORNEY

United States Patent Office 2,885,600
Patented May 5, 1959

2,885,600

ELECTRIC CABINET

Arthur W. Wiseman, Dayton, Ohio, assignor to The Sheffield Corporation, Dayton, Ohio, a corporation of Delaware Application November 1, 1957, Serial No. 693,853

3 Claims. (Cl. 317—99)

This invention relates to electrical equipment and more particularly to a cabinet for electrical components.

It is an object of this invention to provide a cabinet enclosure for components of complex electrical systems wherein the components are compactly supported for economical installation and ready accessibility for maintenance.

It is a further object to provide such a cabinet wherein electrical components such as relays, electronic items, timers, and special sub-assemblies are mounted on relatively slidable vertical panels independently supported at their upper ends for movement from normal positions within a housing to outside the housing for ready replacement or repair, leads being provided within the housing to the supported components accommodating panel movement to maintain electrical connections in both positions.

It is a further object to provide such a cabinet wherein the electrical components are detachably connected at a common side of each of the panels by plug connections to panel-supported sockets connected to leads at the other panel sides, indicating or manually operated electrical units being mounted on the exterior of the cabinet housing or door.

Other objects and advantages of the invention will be apparent from the following description, the appended claims and the accompanying drawing which illustrates an exemplary embodiment of the invention in perspective.

With increasing complexity of electrical systems and particularly in control systems for complex electrically controlled machine tools, gaging devices and the like, the problem of storing or enclosing electrical components compactly while retaining ease and economy of installation and maintenance has become increasingly difficult.

Electrical components such as relays, timers, electronic equipment, and special sub-assemblies must be compactly mounted but readily accessible. Indicating and manually operated controls must be clearly visible and convenient to the operator.

The particular cabinet illustrated for the purpose of disclosing the features of the present invention is of a type provided for the electrical system of a machine tool or gaging device. In the illustrated cabinet electrical components are plugged into sockets carried by vertical supporting panels. The panels are guided for movement from a compact arrangement within an enclosing housing to the exterior thereof where they are readily accessible. A cover, preferably a hinged door, is provided to fully enclose the panels and their supported components. Indicating and manually operated controls are carried by the door in this example. Electrical leads are provided within the cabinet leading to the supported components to accommodate panel and door movement.

Referring particularly to the drawing the cabinet illustrated includes a box-like housing 10 which has one open vertical side. A plurality of rectangular panels 11 are provided which have major dimensions generally commensurate with the depth and vertical width of housing 10. These panels 11 are supported by extensible guides 12 which carry the panels for movement from positions within the housing for storage to positions outside housing 10 for repair and replacement. In the illustrated unit the left hand panel 11 is shown within housing 10 and the right hand panel is beyond the housing where the components it supports are readily accessible.

A plurality of electrical components 16 are carried by each of the panels. The majority of components 16 are connected by means of plugs such as those indicated at 20 to sockets 21 carried by the respective panel. Thus the electrical components are readily removed and replaced.

A door 22 hinged at 24 to housing 10 cooperates with the open side of the housing to completely enclose panels 11 and the components 16 which they support. Door 22 is openable to clear the panels so that they can be independently moved edgewise to and from housing 10.

Where indicating or manually actuated components are involved they are conveniently mounted on door 22 so that they are visible from the exterior of the cabinet. As illustrated a counter 26 and signal lamp 27 are supported by door 22 as are control buttons 28.

Electrical leads 30, extending through the wall of housing 10, connect through terminal strips such as indicated at 32 to continuing leads 34 extending along one side of the respective panel 11 to the sockets 21 to which components 16 are detachably connected. By including wiring or electrical leads on a common side of the panel and using plug-in electrical components the wiring on the panels can be easily installed from one side thereof and without the major components being permanently wired into the circuits. Where standard plug-in type components are not available it is expedient to construct sub-assemblies and provide a plug-in connection.

In a machine or electrical system having clearly defined stations or logical divisions, wherever possible the electrical components associated with a particular station or division are included on a common panel. The length of leads 30, 34 shown in the drawings, as well as those to the door mounted components is sufficient to maintain the connections during sliding movement of the panels 11 and opening and closing of door 22. Thus a particular panel can be easily pulled out of the housing and worked on while the connections are maintained.

Opening of door 22 exposes the edges of panels 11 so that they can be moved outward to render the components they support as well as their respective leads accessible for adjustment, repair, or replacement. With door 22 closed an extremely compact unit is provided.

While the form of apparatus herein described constitutes preferred embodiment of the invention, it is to be understood that the invention is not limited to this precise form of apparatus and that changes may be made therein without departing from the scope of the invention which is defined in the appended claims.

What is claimed is:

1. A cabinet for components of an electrical system comprising a box-like housing having one open side, a plurality of panels for mounting electrical components of the system, means in said housing supporting said panels in vertical parallel closely spaced relationship compactly arranged within said housing perpendicular to the open housing side, said supporting means including means carrying each of said panels for the independent edgewise movement in the plane of the respective panel through the open side of the housing between positions within the housing and outside the housing for ready accessibility while remaining supported by the supporting means, flexible electrical leads within said housing leading to each of said panels for connection to components supported thereby, said leads being of a length to accommodate said movement while maintaining said connections in either panel position, and cover means cooperating with the open side of said housing to completely enclose said panels and openable to expose and clear the panels for movement to and from the housing.

2. A cabinet for components of an electrical system comprising a box-like housing having one open side, a plurality of rectangular panels for mounting components of the system, said panels having major dimensions corresponding substantially to the depth and one transverse dimension of said housing, means in said housing vertically supporting said panels compactly arranged within the housing, said supporting means including guide means carrying each of said panels for independent edgewise movement between positions within the housing and outside the housing for ready accessibility, electrical leads extending through one wall of said housing into the housing and to each of said panels for connection to components supported thereby, said leads being of a length to accommodate said movement to maintain said connections in either panel position, and cover means hinged on said housing and cooperating therewith to completely enclose said panels and openable to expose and clear corresponding panel edges for movement of the panels to and from the housing.

3. A cabinet for components of an electrical system comprising a box-like housing having one open side, a plurality of rectangular panels for mounting components of the system, means in said housing vertically supporting said panels compactly arranged within the housing, said supporting means including supporting guides carrying each of said panels for independent manual movement between positions within the housing and outside the housing for ready accessibility, a plurality of electrical components for each of said panels, means cooperating between each component and its respective panel including plug and socket means for detachable connection of the components, said socket means being mounted on a common side of each of the panels, electrical leads extending through the wall of said housing into the housing and to each of said socket means, said electrical leads being of a length to accommodate movement of each panel between its extreme positions to maintain connections to said socket means, and a door hinged to said housing to enclose the open side thereof and openable to expose and clear the panels for movement to and from the housing.

References Cited in the file of this patent

UNITED STATES PATENTS

| | | |
|---|---|---|
| 2,130,250 | Reed | Sept. 13, 1938 |
| 2,731,609 | Sobel | Jan. 17, 1956 |